Sept. 24, 1957      L. A. BIXBY      2,807,486
JOINT
Filed March 18, 1953
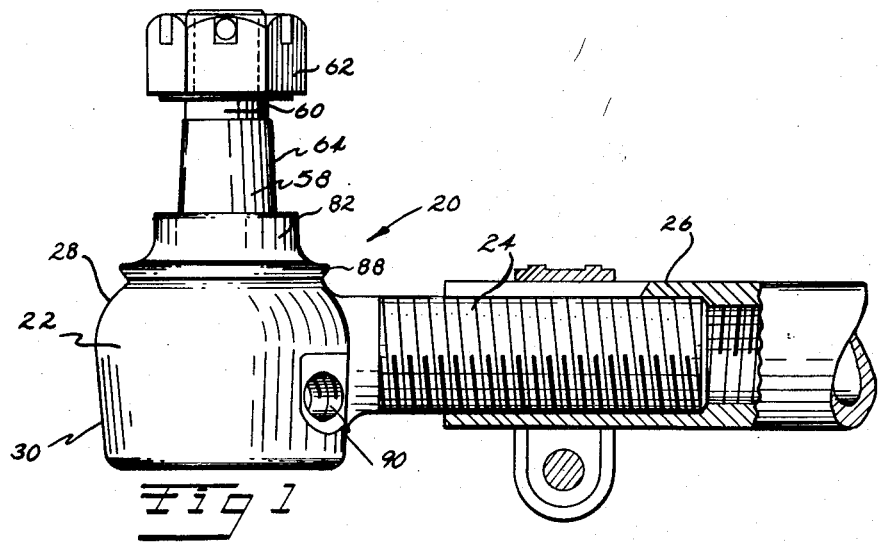
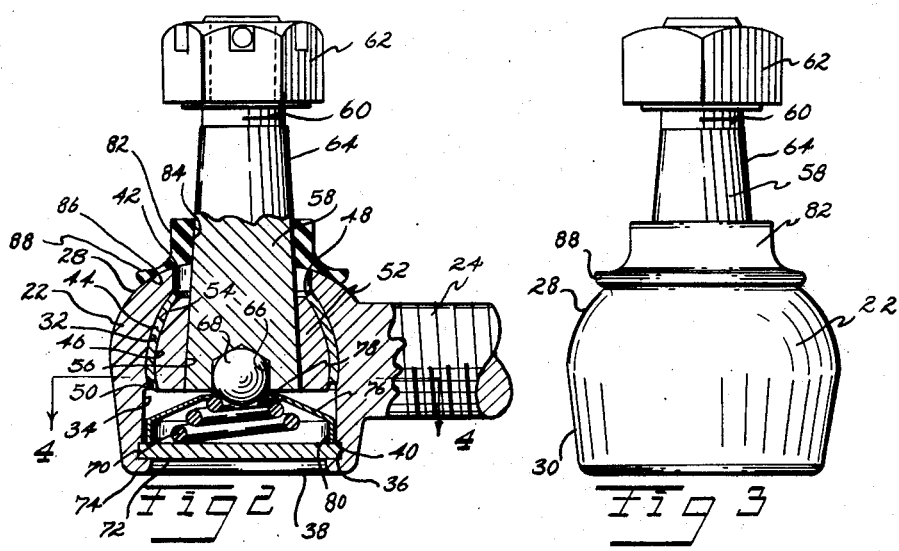
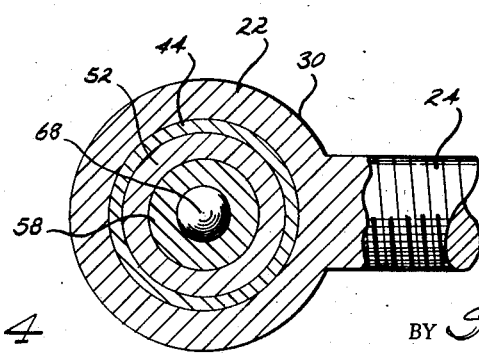
INVENTOR
Leo A. Bixby
BY *Strauch, Nolan & Diggins*
ATTORNEYS United States Patent Office 2,807,486
Patented Sept. 24, 1957

2,807,486
JOINT

Leo A. Bixby, Niles, Mich., assignor, by mesne assignments, to Rockwell Spring and Axle Company, Coraopolis, Pa., a corporation of Pennsylvania Application March 18, 1953, Serial No. 343,163

4 Claims. (Cl. 287—90)

This invention relates to highly loaded multi-action joints and more particularly to joints as for vehicle tie rods and the like.

Joints of this nature are subjected to excessively high loading and vibrational conditions during the operation of the vehicle which may cause the various elements of the joint to lose their efficiency some because of excessive wear due to friction and others through mechanical failure due to severe twisting, bending and like stressing of the elements.

The present invention contemplates a novel joint for tie rods and the like, in which the various elements which make up the joint are constructed and arranged to effectively withstand the particular conditions they encounter in operation and to deliver maximum efficiency during sustained operation for periods heretofore not attained.

United States Letters Patent to G. H. Hufferd No. 2,054,082 discloses a structure and process of making a joint that represents considerable advance toward overcoming some of the difficulties encountered in this field and represents present day construction. The invention embodies certain improvements and novel details of construction over the Hufferd patent which materially lower the costs of manufacture and servicing and which result in an entirely new joint that is more effective than Hufferd in overcoming the difficulties caused by the severe conditions under which such joints operate.

It is therefore a major object of this invention to provide a novel vehicle tie rod and like joint capable of maximum efficiency in withstanding operational stress and frictional wear conditions.

Another object of this invention is to provide a novel joint for vehicle tie rods and the like wherein selected elements of the joint are either independently hard or tough to have maximum resistance to either friction or mechanical stress according to the conditions they encounter in operation.

A further object of this invention is to provide a novel joint for vehicle tie rod ends and the like comprising a hollow chiefly spherical housing for maximum strength.

Yet another object of this invention is to provide a novel joint for vehicle tie rod and like ends having a hollow chiefly spherical housing of tough metal containing a thin spherical bearing lining of harder metal.

A further object of this invention is to provide a novel joint for vehicle tie rod ends and the like having a separate coacting hardened ball and toughened stud within the housing.

Still another object of this invention is to provide a joint for vehicle tie rod ends and the like having a separate ball and stud wherein the housing contains novel spring means for biasing the ball and stud and novel retaining means for the spring.

A further object of this invention is to provide an entirely novel joint combination for vehicle tie rod ends comprising a hollow spherical housing having a thin hard spherical bearing lining, and a toughened stud having a bearing element for contact with the lining and seated on a separate hardened bearing ball, together with novel spring and retaining means for biasing the various bearings and stud into coacting engagement.

These and other objects and advantages will appear from the following description and appended claims when read in connection with the attached drawing, wherein:

Figure 1 is a side elevation view of a tie rod end joint according to a preferred embodiment of this invention particularly showing the spherical housing;

Figure 2 is an elevation partly broken away and in section of this joint showing the bearing structure, the separate ball and stud arrangement, and the spring and retainer assembly;

Figure 3 is an end elevation of the joint further illustrating the housing; and

Figure 4 is a section taken substantially along line 4—4 of Figure 2.

A universal action joint generally indicated at 20 comprises a hollow housing 22 having integral threaded solid shank 24 extending laterally therefrom for threaded engagement with a tie rod 26 that has a like joint at the other side of the vehicle.

Housing 22 has a generally spheroidal exterior portion 28 which merges into downwardly extending frustoconical portion 30. This shape of the housing permits easy fabrication by standard forging or casting methods, and has been found preferable for maximum strength. Sharp corners which are often the location of stress concentrations and the cause of eventual failures are eliminated as much as possible. Housing 22 is of relatively soft but tough steel to have the qualities necessary to withstand the mechanical stresses to which it is subjected. The interior of housing 22 is similarly formed with a spheroidal zone 32 which merges into downwardly extending cylindrical bore 34. Enlarged axially aligned counterbore 36 extends inwardly from outer edge 38 and forms with bore 34 an internal retaining shoulder 40, for a purpose to be explained. The upper end of housing 22 has an axially aligned bore 42 concentric with bore 34, so that the housing itself is open top and bottom.

A thin spherical bearing shell 44, preferably of SAE 1010 steel and hardened as by cyaniding to produce a wear resistant inner surface 46, is press fitted into zone 32 of housing 22 to provide a wear resistant lining. Lining 44 is preferably of uniform thickness and has axially aligned end openings 48 and 50. Shell 44 provides a maximum area of bearing surface with no appreciable increase in size of the joint over prior art devices. The bearing shell 44 moreover requires less hardened bearing material than the corresponding part in Hufferd for example and is much less expensive to manufacture.

A bearing member 52 has a spherical outer surface 54 of the same contour as surface 32. Member 52 has an internal continuously tapered smooth bore 56 by which it is mounted on the lower end of a tapered stud 58. Bearing member 52 is disposed within housing 22 so that surfaces 46 and 54 are in intimate substantially coextensive bearing contact. Bearing member 52 which is snugly fitted upon stud 58 is preferably made of SAE 8620 or 8120 steel which is carburized to a hardness of about 58 to 65 Rockwell C for a depth of .040 to .050 inch below the surface 54. This hardness will effectively resist wear to surface 46 by the rubbing surface 54 of bearing member 52. In order to assure accurate and smooth bearing contact between surfaces 46 and 54 and prevent grabbing of the bearing surfaces they are preferably lapped together during assembly of the joint.

Stud 58 is accurately finished with a smooth continuous taper toward its larger lower end on which bearing element 52 is wedged and extends above housing 22 through bore 42. The upper end of stud 58 is threaded at 60 for receiving a lock nut 62 which retains a drag link connection (not shown) to the exposed tapered portion 64 of the stud. The stud is subjected to severe twisting and bending in operation and must be tough to withstand these stresses. I have found that a stud made of SAE 8640 or 8140 and heat treated to approximately 285 to 341 Brinell produces a competently tough stud capable of withstanding the severest twisting, bending and like operational stresses encountered in vehicle tie rod ends.

As shown in Figure 2, openings 42 and 48 are materially larger than stud 58 to permit free oscillatory movement or angular deflection of the stud in any direction. By virtue of the wedged engagement of stud 58 and bearing member 52 any angular movement of the stud causes bearing member 52 to rotate in relative bearing contact with lining 44.

The lower end of stud 58 within housing 22 is formed with an axial cylindrical recess 66 to surround and provide a seat for a spherical steel bearing ball 68. Ball 68 must be very hard to effectively resist frictional wear, and is preferably a standard ball bearing made of SAE 52100 steel heat treated to a hardness of 60 to 65 Rockwell C. A helical coil spring 70 is mounted in bore 34 with its smaller end in contact with steel ball 68. Spring 70 is compressed between ball 68 and a cover plate 72 mounted in counterbore 36. Plate 72 is retained in the counterbore by peening over edge 38 as at 74. Spring 70 resiliently biases the ball and stud upwardly to urge surfaces 46 and 54 into bearing contact without hampering the universal rocking of the stud relative to the housing.

A cup-shaped stamped sheet metal spring retainer 76 having axially aligned openings 78 and 80 is mounted to enclose spring 70 with smaller opening 78 adjacent ball 68 to permit the small end of conical spring 70 to extend freely therethrough and contact the ball. The cup-shaped configuration of retainer 76 serves to properly control and locate the spring for proper contact with the ball.

A resilient molded rubber or plastic seal 82 is mounted with its conical bore 84 in close sealing contact with conical portion 64 of stud 58 and with a molded spherical surface 86 in close sealing contact with outer surface 28 of the housing, to effectively complete sealing of the interior of the housing from entry of foreign substances and leakage of lubricant. The edge of seal 82 is provided with beaded portion 88 to give added rigidity to spherical surface 86 to prevent this portion of seal 82 from being easily moved away from the outer surface of the housing and exposing bore 42 to foreign substances.

A laterally extending threaded opening 90 extends into bore 34 to accommodate a grease fitting (not shown) to permit periodic lubrication of the various bearing members.

From the foregoing it will be seen that I have developed a novel joint in which the elements thereof can be made by standard and simple manufacturing processes and which lends itself to easy assembling and disassembling techniques. The joint of the invention has greatly extended the expected operational life of tie rod end joints since the constituent elements thereof have been tailored to independently perform their respective functions and so coact that undesired stresses are not transmitted to elements not capable of handling them. Therefore those elements which are subject to severe mechanical stress have the necessary qualities of toughness to withstand such stresses while those elements which must withstand heavy wear have the necessary qualities of hardness. As a result, failures which have heretofore occurred in prior art elements, because such elements were treated to have portions that were hard and other portions that were tough, has been effectively eliminated. The novel joint of this invention results in a joint of maximum strength and operational life with a minimum in manufacturing and service costs. In prior art devices such as Hufferd for example the studs and their bearing elements were integrally formed. Such constructions necessitated hardening of certain portions of the stud bearing surfaces to withstand wear while the major portion of the stud itself had to be maintained relatively soft to have the desired toughness to withstand the twisting and bending stresses imposed thereon. As a result of such circumstance, and the complex heat treating required, the studs usually failed at critical areas of separation or demarcation between the hardened and relatively soft portions of the stud. Additionally, the manufacturing costs of such complex integral elements are high because of the control needed to separately heat treat part of the same stud. The elements of the novel joint of this invention have been so designed and arranged to independently perform their functions, as nearly as possible, of either resisting wear or stress thereby eliminating most stud failures encountered in prior art integral multi-heat treated elements.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A joint comprising a hollow housing, a thin hard spherically curved metal lining shell stationarily mounted in said housing, a movable bearing element having a continuously tapered through bore mounted in said housing and having a hard spherically curved external surface in bearing contact with said lining shell, a stud composed throughout of softer tougher metal than said shell having a continuously tapered section which at the larger end within said housing is tightly mounted within said bore, said stud being movable with said bearing element and extending exteriorly of said housing, a mechanism attachment section on the smaller end of said stud exteriorly of said housing, said continuous tapered section of the stud comprising the major portion of the length of the stud and providing a continuously sloping uninterrupted surface on the entire stud exclusive of said attachment section, and a resilient universal connection between the larger end of the stud and the housing.

2. A joint comprising a hollow housing having a spherically curved inner wall portion, a thin hard spherically curved lining element mounted in said wall portion and forming a spherically curved hard wear resistant bearing surface within said housing, a relatively movable bearing element mounted within said housing having a hard spherically curved surface in universal bearing contact with said lining element, said bearing element having a smooth continuously tapered through bore, a continuously tapered stud which is of softer tougher metal than said bearing surfaces having the smooth tapered surface at its larger end tightly friction locked within said bore and its other end projecting freely from said housing, a mechanism attachment section on the smaller end of said stud outside the housing, said continuous smooth taper of the stud extending without interruption along the entire length of said stud up to said attachment section, and resilient means biasing said movable bearing element and stud together and also biasing said bearing element into contact with said lining element.

3. An end joint for tie rods and the like comprising a hollow housing open at top and bottom, a thin hard spherically curved shell within said housing defining a spherically curved internal bearing surface within said housing, a bearing member within said housing having a hard spherically curved external surface in contact with said internal surface, said bearing member having a continuously tapered through bore, a stud projecting freely through one of said housing openings having a smooth continuously tapered section at one end frictionally and tightly locked within said bore and having a gradually uniformly reduced circular cross section and a smoothly sloping external surface extending without interruption from said one end to a mechanism attachment section on the other end externally of said housing, said stud being made of a metal which is tougher and more resistant to twisting stresses than the metal at said bearing surfaces, and resilient means within said housing biasing said spherically curved surfaces into contact.

4. An end joint for tie rods and the like comprising a hollow housing open at top and bottom and having an internal surface of substantially spherical contour, a thin hard bearing shell of substantially uniform thickness and the same contour as said surface pressed within said housing to line said surface with a hard spherically curved bearing face, a stud of softer tougher metal than said shell having its lower end disposed within said housing and its upper end projecting freely through the open top of said housing, said stud comprising a uniformly and continuously tapered section for the major part of its length reducing toward and up to a mechanism attachment section outside the housing, a bearing member having a smooth continuously tapered bore tightly fitted upon the tapered end of said stud within the housing and having a hard smooth spherically curved external face in contact with said shell face, and resilient means within said housing urging said spherically curved faces into bearing contact.

References Cited in the file of this patent

UNITED STATES PATENTS

| | | |
|---|---|---|
| 1,359,318 | Bermay | Nov. 16, 1920 |
| 1,957,781 | Hufferd | May 8, 1934 |
| 2,054,082 | Hufferd | Sept. 15, 1936 |
| 2,141,753 | Hufferd et al. | Dec. 27, 1938 |
| 2,178,206 | Katcher | Oct. 31, 1939 |
| 2,265,839 | Hufferd et al. | Dec. 9, 1941 |
| 2,291,161 | Katcher | July 28, 1942 |
| 2,701,151 | Booth | Feb. 1, 1955 |

FOREIGN PATENTS

| | | |
|---|---|---|
| 680,987 | Germany | Sept. 11, 1939 |